United States Patent
Klooster et al.

(10) Patent No.: US 7,440,114 B2
(45) Date of Patent: Oct. 21, 2008

(54) OFF-AXIS PARABOLOID INTERFEROMETRIC MIRROR WITH OFF FOCUS ILLUMINATION

(75) Inventors: Alex Klooster, Ann Arbor, MI (US); Carl C. Aleksoff, Dexter, MI (US)

(73) Assignee: Coherix, Inc., Ann Arbor, MI (US)

( * ) Notice: Subject to any disclaimer, the term of this patent is extended or adjusted under 35 U.S.C. 154(b) by 81 days.

(21) Appl. No.: 11/301,320

(22) Filed: Dec. 12, 2005

(65) Prior Publication Data
US 2007/0133010 A1    Jun. 14, 2007

(51) Int. Cl.
*G01B 11/30* (2006.01)
(52) U.S. Cl. .................................... 356/512
(58) Field of Classification Search ............... 356/489, 356/495, 511–515
See application file for complete search history.

(56) References Cited

U.S. PATENT DOCUMENTS

| | | | |
|---|---|---|---|
| 2,693,065 A * | 11/1954 | Zobel et al. ............. | 356/512 |
| 4,653,855 A | 3/1987 | Birnbach | |
| 4,814,774 A | 3/1989 | Herczfelt | |
| 5,071,251 A | 12/1991 | Hochberg et al. | |
| 5,291,269 A * | 3/1994 | Ledger ...................... | 356/514 |
| 5,548,403 A * | 8/1996 | Sommargren ............ | 356/513 |
| 5,907,404 A | 5/1999 | Marron | |
| 5,926,277 A | 7/1999 | Marron | |
| 6,327,038 B1 | 12/2001 | Maxey | |
| 6,507,405 B1 | 1/2003 | Grek et al. | |
| 6,806,965 B2 | 10/2004 | Deck | |
| 2003/0112442 A1 | 6/2003 | Baney et al. | |
| 2003/0142317 A1 | 7/2003 | Mater | |
| 2004/0179204 A1 | 9/2004 | Hizuka et al. | |
| 2005/0002041 A1 | 1/2005 | Mater | |
| 2005/0270543 A1 | 12/2005 | Ge et al. | |
| 2007/0019207 A1 * | 1/2007 | Kuhn et al. ............. | 356/511 |
| 2007/0024866 A1 | 2/2007 | Nisper | |
| 2007/0024867 A1 | 2/2007 | Mater | |

FOREIGN PATENT DOCUMENTS

SU    518622 A  *  7/1976

* cited by examiner

*Primary Examiner*—Samuel A Turner
(74) *Attorney, Agent, or Firm*—Jeffrey Schox

(57) ABSTRACT

An off axis paraboloid mirror is used to provide object illumination in an interferometric imaging system. The light from an object illumination light source diverges from a point apart from the focus point of the paraboloid, proceeds to the parabolic mirror surface, and is reflected as a nearly parallel beam to illuminate the object.

21 Claims, 5 Drawing Sheets

Wavefront on object ... distortion 18 waves

Wavefront on camera... distortion .365 waves

OFF-AXIS PARABOLOID INTERFEROMETRIC MIRROR WITH OFF FOCUS ILLUMINATION

FIELD OF THE INVENTION

The field of the invention is the field of measuring surface topography of an object.

BACKGROUND OF THE INVENTION

Interferometry has been used for over a century to measure the surface topography of objects, typically optical components, and distances and small changes in such distances. With the advent of lasers having long coherence lengths and high brightness, the field has expanded greatly. Interferometric comparison of objects with a known surface, as depicted by FIG. 1, has been difficult to implement for very large objects with surfaces with steps or slopes greater than a half wavelength of light per resolution element of the imaging system, because the phase count is lost, and the height of the object surface is known only modulo $\lambda/2$, where $\lambda$ is the wavelength of light used for the interferometer.

If a series of imaging interferograms are recorded with different wavelengths $\lambda_i$, the ambiguity in the phase may be resolved, and the heights on the object surface relative to a particular location on the particle surface may be calculated, as is shown in the patents cited below.

RELATED PATENTS AND APPLICATIONS

U.S. Pat. No. 5,907,404 by Marron, et al. entitled "Multiple wavelength image plane interferometry" issued May 25, 1999;

U.S. Pat. No. 5,926,277 by Marron, et al. entitled "Method and apparatus for three-dimensional imaging using laser illumination interferometry" issued Jul. 20, 1999;

U.S. patent application Ser. No. 10/893052 filed Jul. 16, 2004 entitled "Object imaging system using changing frequency interferometry method" by Michael Mater;

U.S. patent application Ser. No. 10/349651 filed Jan. 23, 2003 entitled "Interferometry method based on changing frequency" by Michael Mater;

U.S. patent application Ser. No. 11/181664 filed Jul. 14, 2005 by inventors Jon Nisper, Mike Mater, Alex Klooster, Zhenhua Huang entitled "A method of combining holograms";

U.S. patent application Ser. No. 11/194097 filed Jul. 29, 2005 by inventor Mike Mater et. al entitled "Method for processing multiwavelength interferometric imaging data".

A US patent application filed the same day as the present application, listing the same inventors, and entitled "Optical fiber delivered reference beam for interferometric imaging".

The above identified patents and patent applications are assigned to the assignee of the present invention and are incorporated herein by reference in their entirety including incorporated material.

OBJECTS OF THE INVENTION

It is an object of the invention to produce an interferometric system for investigating, imaging, and measuring the topography of the surfaces of large objects.

It is an object of the invention to produce an interferometric system having lighter and less expensive optical elements.

SUMMARY OF THE INVENTION

A large off axis paraboloid mirror is used in combination with a light source positioned apart from the focus of the paraboloid mirror to provide an illumination source in an interferometric inspection system.

DETAILED DESCRIPTION OF THE INVENTION

Figure 1:
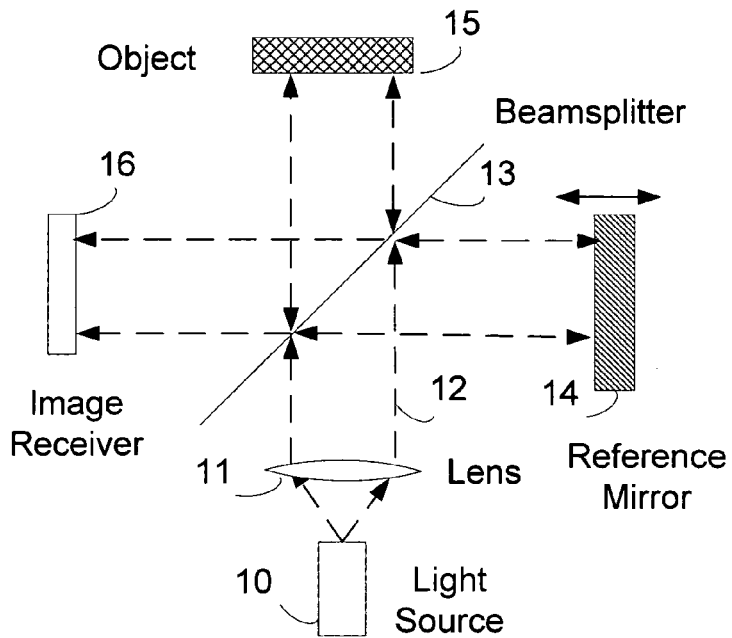
FIG. 1 shows a sketch of a prior art interferometer.

FIG. 1 shows a sketch of a prior art interferometer. The particular interferometer shown in FIG. 1 is conventionally called a Michelson interferometer, and has been used since the nineteenth century in optical experiments and measurements. A light source 10 produces light which is collimated by passing through a lens system 11 to produce a parallel beam of light 12 which passes to a beamsplitter 13. The beam of light 12 is partially reflected to a reference mirror 14 and partially transmitted to an object 15. Light reflected from the reference mirror 14 partially passes through the beamsplitter to an image receiver 16. Light reflected from the object is partially reflected from the beamsplitter 15 and is passed to the image receiver 16. The image receiver 16 may be film, or may be an electronic photodetector or a CCD or a CMOS array, or any other image receiver known in the art. The image receiver 16 may also include additional lenses, not shown, for imaging purposes.

If both the reference mirror 14 and the object 15 are flat mirrors aligned perpendicular to the incoming light from beam 12, and the light path traversed by the light from the light source to the image receiver is identical, the light from both the reference mirror and the object mirror will be in phase, and the image receiver will show a uniformly bright image. Such devices were the bane of undergraduate optics students before the advent of lasers, since the distances had to be equal to within distances measured by the wavelength of the light and the mirrors had to be aligned within microradians. Even with the advent of lasers with very long coherence lengths, such devices are subject to vibration, thermal drift of dimensions, shocks, etc.

However, the Michelson interferometer design of FIG. 1 is useful to explain the many different types of interferometers known in the art. In particular, suppose the reference mirror 14 is moved back and forth in the direction of the arrow in FIG. 1. As the reference mirror is moved, the phase of the light beam reflected from the reference mirror and measured at the image receiver 16 will change by 180 degrees with respect to the phase of the light reflected from the object 15 for every displacement of one quarter wavelength. The light from the two beams reflected from the object 15 and the reference mirror 14 will interfere constructively and destructively as the mirror moves through one quarter wavelength intervals. If the intensity of both the reference and object beams are equal, the intensity at the image receiver will be zero when the mirrors are positioned for maximum destructive interference. Very tiny displacements of one of the mirrors 14 or 15 can thus be measured.

Figure 2:
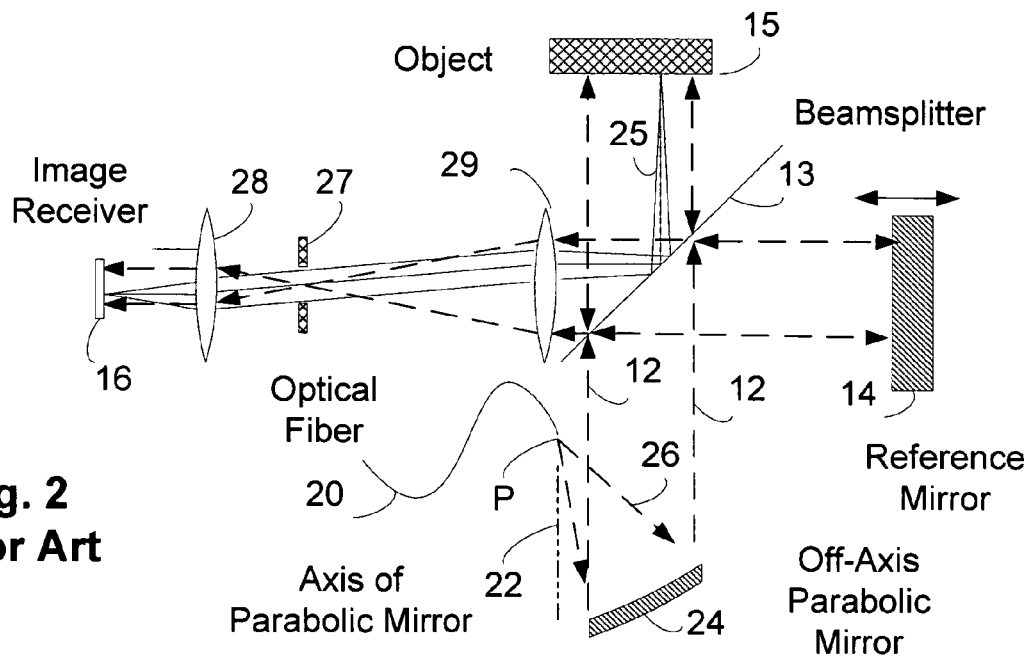
FIG. 2 shows a sketch of a prior art imaging interferometer.

FIG. 2 shows a sketch of an prior art imaging interferometer much like the interferometer of FIG. 1, except that the light source does not use a lens to collimate the light into a parallel beam 12. Instead, an off-axis parabolic mirror 24 is used to reflect the light output 26 of an optical fiber 20 into a parallel beam of light 12. Mirror 24 is a section having a reflecting surface which is part of a parabola of revolution about the axis 22. The end of the optical fiber 20 is placed on the axis 22 at or very near the focal point P of the parabolic mirror, ie. the point to which a parallel light beam parallel to light beam the axis 22 (which is the optical axis of the parabolic mirror) coming in to and reflected from the mirror 24 would be focused. The optical fiber 20 may incorporate a lens system (not shown) to diverge the beam of light appropriately so that the beam of light appears to diverge from the focal point P. An optical system (shown symbolically as lenses 28 and 29) is shown for imaging the surface of the object 15 on to the image receiver 16. The optical system 29 and image receiver 15 are incorporated in the most preferred embodiment of the invention as a camera, where the image size of the object 15 on the image receiver may be much smaller than the size of the object 15. The optical set up sketched in FIG. 2 is shown as a telecentric optical system, where diverging light rays 25 scattered from a point on the surface of the object 15 diverge until they pass through lens 29, then travel parallel to each other through an aperture 27, and are converged again to a point on the surface of the image receiver 16.

The term off-axis parabolic mirror is used in this specification to mean that the part of the parabolic mirror used in the optical system is off the optical axis of the parabola. Clearly, if the part of the light from the optical fiber 26 struck a parabola on axis 22, that light would be directed back to the focal point P and would not be available for use in the interferometer because of shadowing of the fiber. The light beam 26 is shown diverging from the end of the fiber 20, but a lens system (not shown) is anticipated for controlling the divergence of the light exiting the optical fiber 20. Preferably, the light beam 26 fills the entire aperture of the off-axis paraboloid 24, or at least enough of the area of mirror 24 so that the entire field of interest of the surface of the object 15 is illuminated by the parallel beam of light 12.

Figure 3:
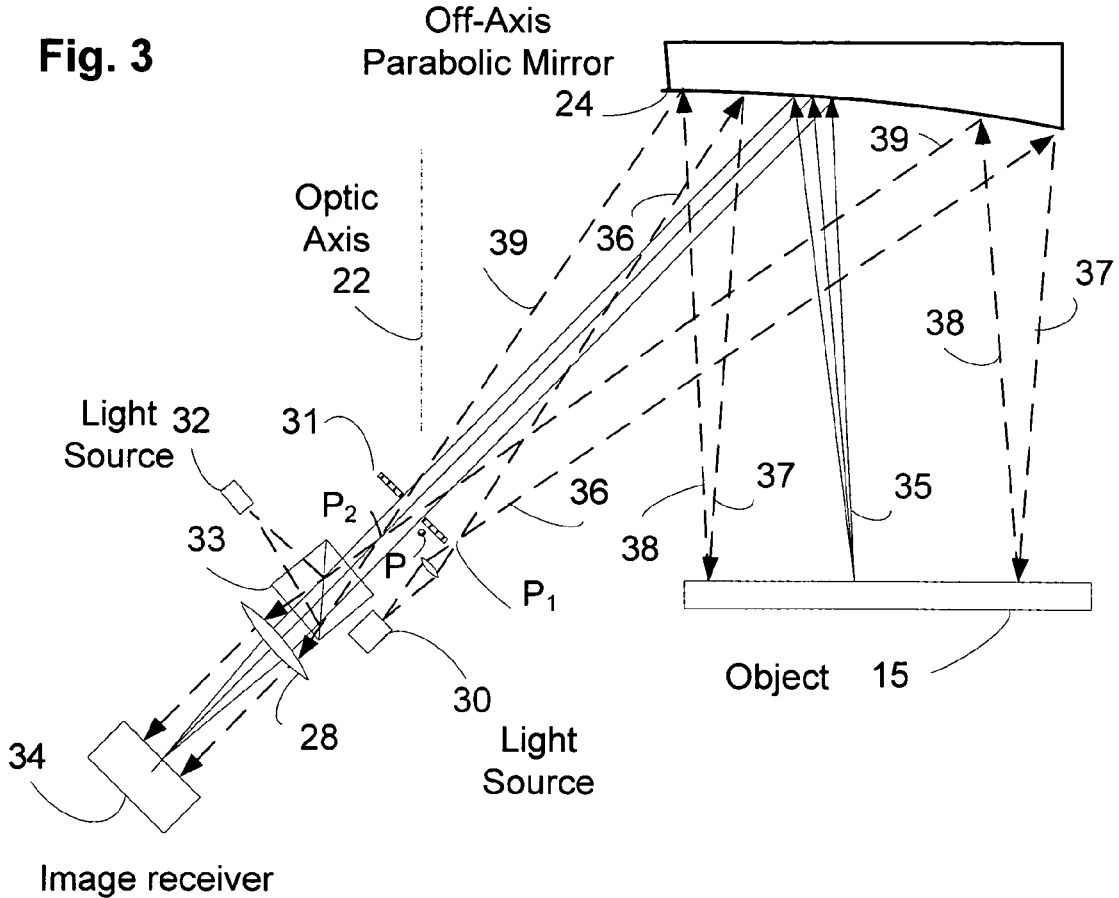
FIG. 3 shows a sketch of an imaging interferometer of the invention.

FIG. 3 shows a sketch of a preferred embodiment of the invention, where the large reference mirror 14, the large beam splitter 13, and the large lens 29 are no longer needed. Light 36 from an object illumination source 30 is shown diverging from a first point P apart from the focus point P of the parabolic mirror. The light travels to the paraboloid and is reflected as a nearly parallel beam 37 which falls on the surface of the object 15. Since the point $P_1$ is apart from the focus point P of the paraboloid, the parallel light beam represented by 37 is not parallel to the optical axis 22 of the parabolic mirror. Light 38 is shown as a parallel beam reflecting from a surface of the object 15, where the surface is perpendicular to the optical axis 22. Light 38 reflects again from the parabolic mirror 24, and is then brought to a focus at a point $P_2$ which is symmetrically located with respect to the focal point P from point $P_1$. An optional aperture 31 limits the light scattered from the object surface 15, and light 39 is combined with light from a reference light source 32 by a small partially reflecting beamsplitter 33. Light scattered from a point on the surface of the object is shown as a bundle of rays 35. An image receiver 34 captures the image of the surface of the object 15 and displays an interferometric phase image of the object surface. A computer (not shown) captures and displays phase images of the surface at different relative phases between the reference source 32 and the object illumination source 30 and different wavelengths of light from the reference source 32 and the object illumination source 30, and constructs synthetic phase images and holograms from the data as detailed in the referenced patents and patent applications.

The object 15 is shown in FIG. 3 as being approximately a focal distance of the parabolic mirror 24 from the parabolic mirror, so that the diverging light bundle 25 is collimated into a parallel beam which passes through aperture 31 on its way to being focused on the image receiver. However, the system as shown is still useful for mirror object distances different from the focal length of mirror 24, since the position of lens 28 may be changed to refocus the light 35 on to the image receiver 34.

In order to use the paraboloid as both a collimating optical element and as an image gathering optical element, there must be room for the incoming and outgoing focused beams to pass each other without obstruction or physical occlusion of either beam. Otherwise, a beam splitter would have to be used at or near the intersection point of the incoming or outgoing beams, and only a quarter of the possible object illumination light would reach the camera. In the apparatus shown in FIG. 3, the beam splitter 33 may transmit most of the light 39, while reflecting only a small part of the light from reference source 32. For the purposes of this specification, the point $P_1$ is defined as apart from the focus P of the paraboloid mirror when the distortion introduced in the beam incident on the object is greater than one wave distortion across the object as long as the paraboloid mirror is parabolic to within a small part of a wavelength. The prior art system cited had the object illumination located so that the wavefront distortion at the object was less than one wave. The point $P_1$ is defined as being near to the point P when the beam 36 passes closely to but is not blocked by aperture 31, and when light source 30 and associated optics do not occlude or block light 39 or obstruct optical elements ecessary to combine beam 39 with a reference beam.

Figure 4:
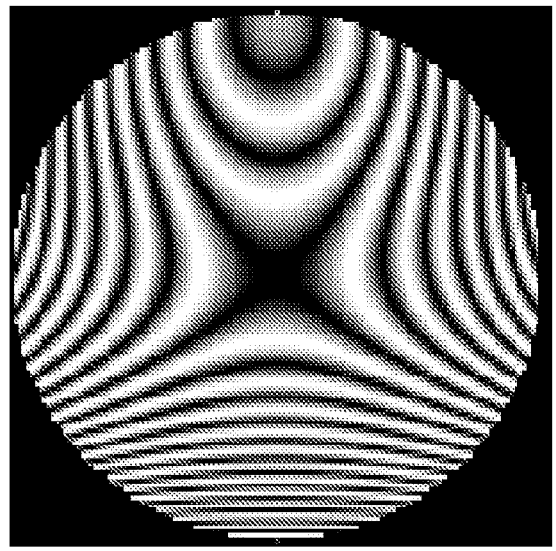
FIG. 4 shows a calculation of the wavefront distortion of the invention measured at the object.
Figure 5:
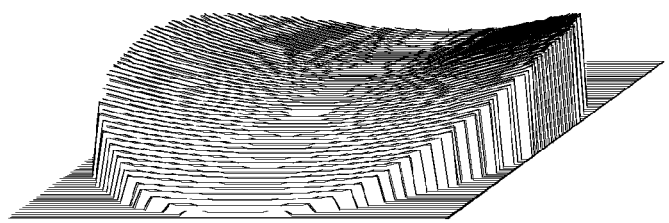
FIG. 5 shows a a calculation of the wavefront distortion of the invention measured at the object.

The inventors have found that, as expected, light diverging from a point which is not coincident with the focus of the parabolic mirror 24 will have large aberrations or distortions when it reaches the object 15. FIG. 4 shows that the calculated distortions at the object are 18 waves when the paraboloid mirror is a 30 cm square mirror where the optical axis is 48 mm from the edge of the mirror, the free space length from P.sub1 to the object 24 surface is 3522 mm, and the point P.sub.1 is displaced from the focus point P by 2 mm However, when the light from a plane mirror replacing the object 15 placed perpendicular to the optic axis 22 of the parabolic mirror is calculated after returning on the path shown in FIG. 3, the inventors have found, surprisingly, that the calculated aberrations cancel to first order, and the distortion at the camera is only 0.365 waves, as shown in FIG. 5.

The object illumination source 30 may be a laser source, a diode laser source, a light emitting diode, an optical fiber laser, or an arc or incandescent light source. The object illumination source 30 may also be a fiber optic light source, where a diode laser source, a light emitting diode, or an arc or incandescent light source is input to the optical fiber. The object illumination source 30 may be a fixed frequency light source, a tunable frequency light source, or indeed, a number n of light sources which are either fixed or tunable.

Figure 6:
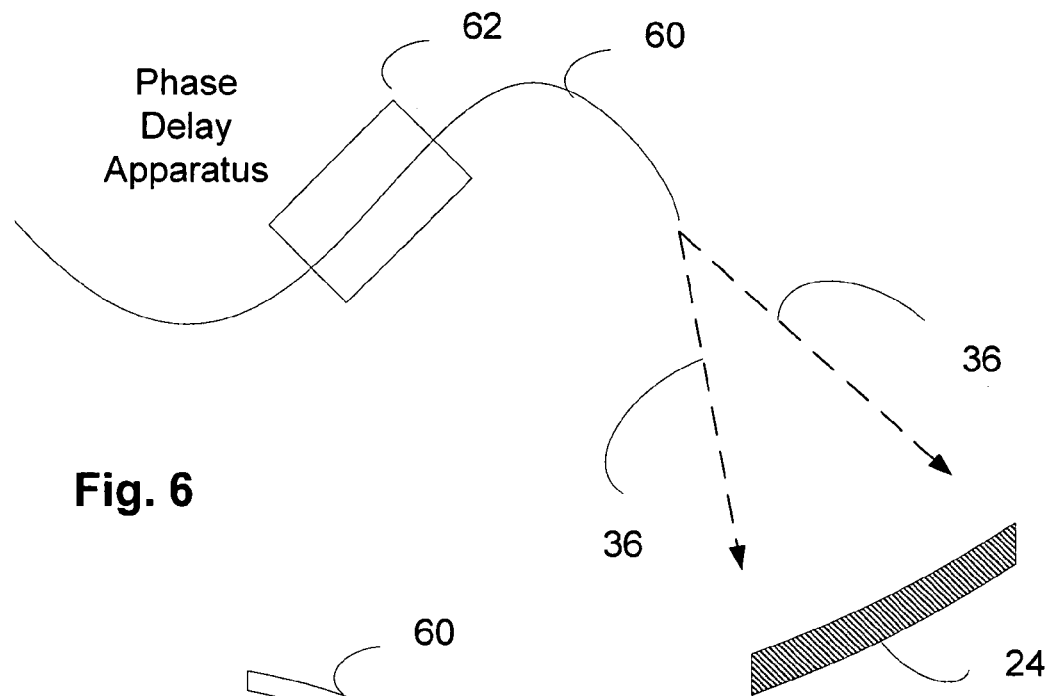
FIG. 6 shows a phase changing apparatus of the invention.

The object illumination source 30 may be an optical fiber which contains a means to change the phase of the light 36 with respect to light from the reference source 32. FIG. 6 shows an optical fiber 60 having a phase delay apparatus 62 for changing the relative phase. A commercial device which stretches the optical fiber 60 has been found to work well.

Figure 7:
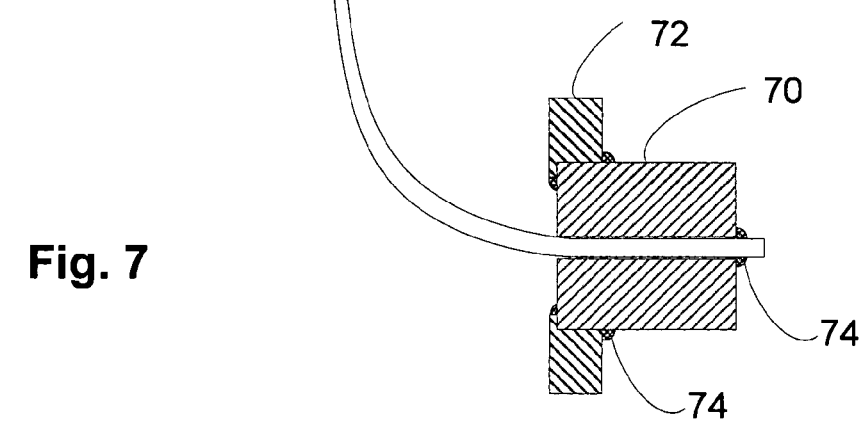
FIG. 7 shows a phase changing apparatus of the invention.

FIG. 7 shows a the most preferred method of introducing a relative phase change in an optical fiber source. Optical fiber 60 is held by an adhesive 74 to one end of a piezo electric tube 70. The other end of the tube 70 is joined to a base 72 which is fixed with respect to the optical system. Applying a voltage to the piezo tube (electrodes and voltage generators and wires not shown) lengthens tube 70 and easily changes the relative phase by a few wavelengths.

Figure 8:
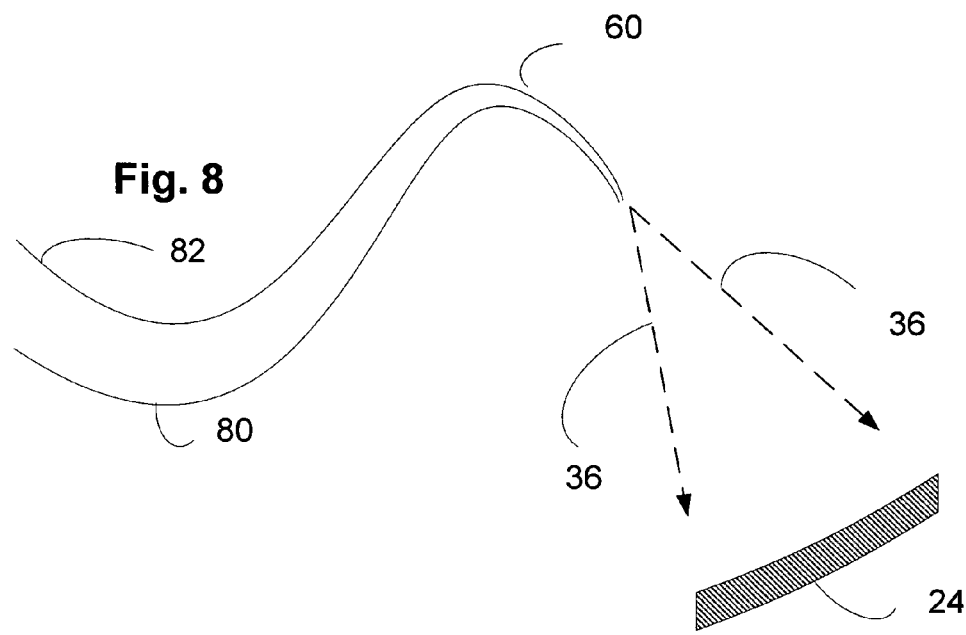
FIG. 8 shows a sketch of an embodiment of the invention.

FIG. 8 shows a sketch of a preferred embodiment of several fibers 80 and 82 producing the object illumination beam 36. Each optical fiber can be place so that the light emitting cores of the fibers are within a few hundred microns of each other. Each optical fiber provides a diverging beam of light which diverges from different points $P_{1n}$. Each of the optical fibers may have individual phase changing device attached, or each fiber may be attached to a single phase changing device.

Figure 9:
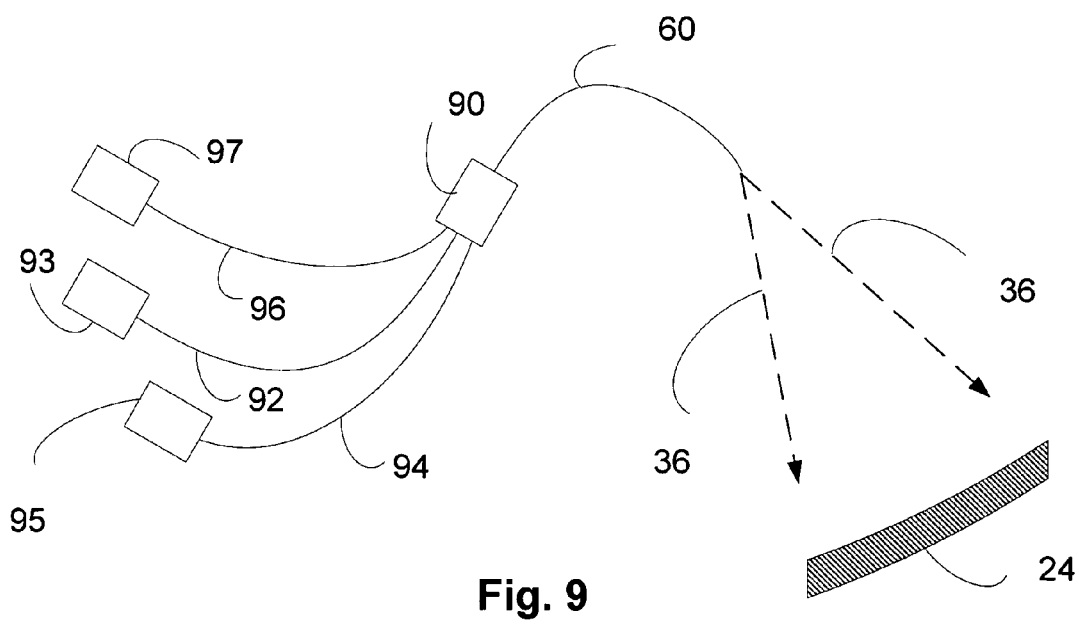
FIG. 9 shows a sketch of an embodiment of the invention.

FIG. 9 shows a sketch of the most preferred embodiment of a system having a number of different light sources. A fiber optical beam combiner 90 is used to combine light from fibers 92, 94, and 96 which receive light from light sources 93, 95, and 97.

Obviously, many modifications and variations of the present invention are possible in light of the above teachings. It is therefore to be understood that, within the scope of the appended claims, the invention may be practiced otherwise than as specifically described.

We claim:

1. An apparatus for illumination of an object in an interferometric imaging system, comprising:
   an off axis paraboloid mirror, and
   one or more optical fiber illumination sources,
   wherein light from the one or more optical fiber illumination sources diverges from a first point apart from the focus point of the off axis paraboloid mirror and proceeding to a reflecting parabolic surface of the off axis paraboloid mirror, the off axis paraboloid mirror reflecting light from the illumination source into a nearly parallel beam of light onto an object,
   wherein light from the nearly parallel beam of light which is specularly reflected from a flat surface of the object to the paraboloid mirror is reflected from the paraboloid mirror and focused to a second point, wherein the first and the second points are symmetrically located with respect to the focus; and
   wherein light from the nearly parallel beam of light which is non-specularly reflected from a flat surface of the object to the paraboloid mirror is reflected from the paraboloid mirror and forms a collimated beam.

2. The apparatus of claim 1, wherein at least one of the one or more optical fiber illumination sources comprises a first optical fiber having a phase changing element for changing the phase of the light produced by the optical fiber illumination source.

3. The apparatus of claim 2, wherein the first optical fiber is stretched to change the phase of the light produced by the optical fiber illumination source.

4. The apparatus of claim 2, wherein the first optical fiber is controllably moved to change the phase of the light produced by the optical fiber illumination source.

5. The apparatus of claim 1, further comprising one or more light sources for injecting light into the one or more optical fiber illumination sources.

6. The apparatus of claim 5, wherein at least one light source comprises a laser light source.

7. The apparatus of claim 5, wherein at least one light source comprises a light emitting diode (LED) light source.

8. The apparatus of claim 5, wherein at least one light source comprises a gas discharge light source.

9. The apparatus of claim 1, wherein a plurality of optical fiber illumination sources is placed to provide diverging light from each fiber illumination source where the diverging light from each fiber diverges from a point near the first point.

10. The apparatus of claim 1, wherein at least one of the optical fiber illumination sources is a tunable wavelength optical illumination source.

11. The apparatus of claim 1, further comprising an aperture placed around the second point.

12. An apparatus for illumination of an object in an interferometric imaging system, comprising:
    an off axis paraboloid mirror, and
    one or more optical fiber illumination sources,
    wherein light from the one or more optical fiber illumination sources diverges from a first point apart from the focus point of the off axis paraboloid mirror and proceeding to a reflecting parabolic surface of the off axis paraboloid mirror, the off axis paraboloid mirror reflecting light from the illumination source into a nearly parallel beam of light onto an object,
    wherein light from the nearly parallel beam of light which is specularly reflected from a flat surface of the object to the paraboloid mirror is reflected from the paraboloid mirror and focused to a second point, wherein the first and the second points are symmetrically located with respect to the focus point;
    an aperture placed around the second point;
    an image receiver;
    an optical system for receiving light reflected from the surface of the object and passing through the aperture to form an image of the surface of the object onto the image receiver;
    an optical fiber reference illumination source different from any of the one or more optical fiber object illumination sources, the optical fiber reference illumination source for illuminating the surface of the image receiver with a reference beam having a defined phase with respect to the light from the one or more optical fiber object illumination sources, wherein light from the optical fiber reference illumination system and light from the optical system for imaging the surface of the object onto the image receiver co-operate to form a phase image of the object on the image receiver.

13. The apparatus of claim 12, wherein the optical fiber reference illumination source comprises an optical fiber having a phase changing element for changing the relative phase of the light produced by the optical fiber reference illumination source with respect to the light produced by the optical fiber object illumination source.

14. The apparatus of claim 13, wherein the optical fiber of the optical fiber reference illumination source is stretched to change the relative phase of the light produced by the optical fiber illumination source.

15. The apparatus of claim 13, wherein the optical fiber of the optical fiber reference illumination source is controllably moved to change the relative phase of the light produced by the optical fiber illumination source.

16. The apparatus of claim 12, further comprising a computer system for receiving phase images from the image receiver and constructing a synthetic phase image of the object.

17. The apparatus of claim 11, further comprising;
    an image receiver;

an optical system for receiving light reflected from the surface of the object and passing through the aperture to form an image of the surface of the object onto the image receiver; and an optical fiber reference illumination source different from any of the one or more optical fiber object illumination sources, the optical fiber reference illumination source for illuminating the surface of the image receiver with a reference beam having a defined phase with respect to the light from the one or more optical fiber object illumination sources, wherein light from the optical fiber reference illumination system and light from the optical system for imaging the surface of the object onto the image receiver co-operate to form a phase image of the object on the image receiver.

18. The apparatus of claim 17, wherein the optical fiber reference illumination source comprises an optical fiber having a phase changing element for changing the relative phase of the light produced by the optical fiber reference illumination source with respect to the light produced by the optical fiber object illumination source.

19. The apparatus of claim 18, wherein the optical fiber of the optical fiber reference illumination source is stretched to change the relative phase of the light produced by the optical fiber illumination source.

20. The apparatus of claim 18, wherein the optical fiber of the optical fiber reference illumination source is controllably moved to change the relative phase of the light produced by the optical fiber illumination source.

21. The apparatus of claim 17, further comprising a computer system for receiving phase images from the image receiver and constructing a synthetic phase image of the object.

* * * * *